Sept. 15, 1936.    G. M. KRIEGBAUM ET AL    2,054,513
PLANTER ATTACHMENT FOR TRACTORS
Filed July 5, 1934    4 Sheets-Sheet 2

Inventors
George M. Kriegbaum
Clarence C. Haas

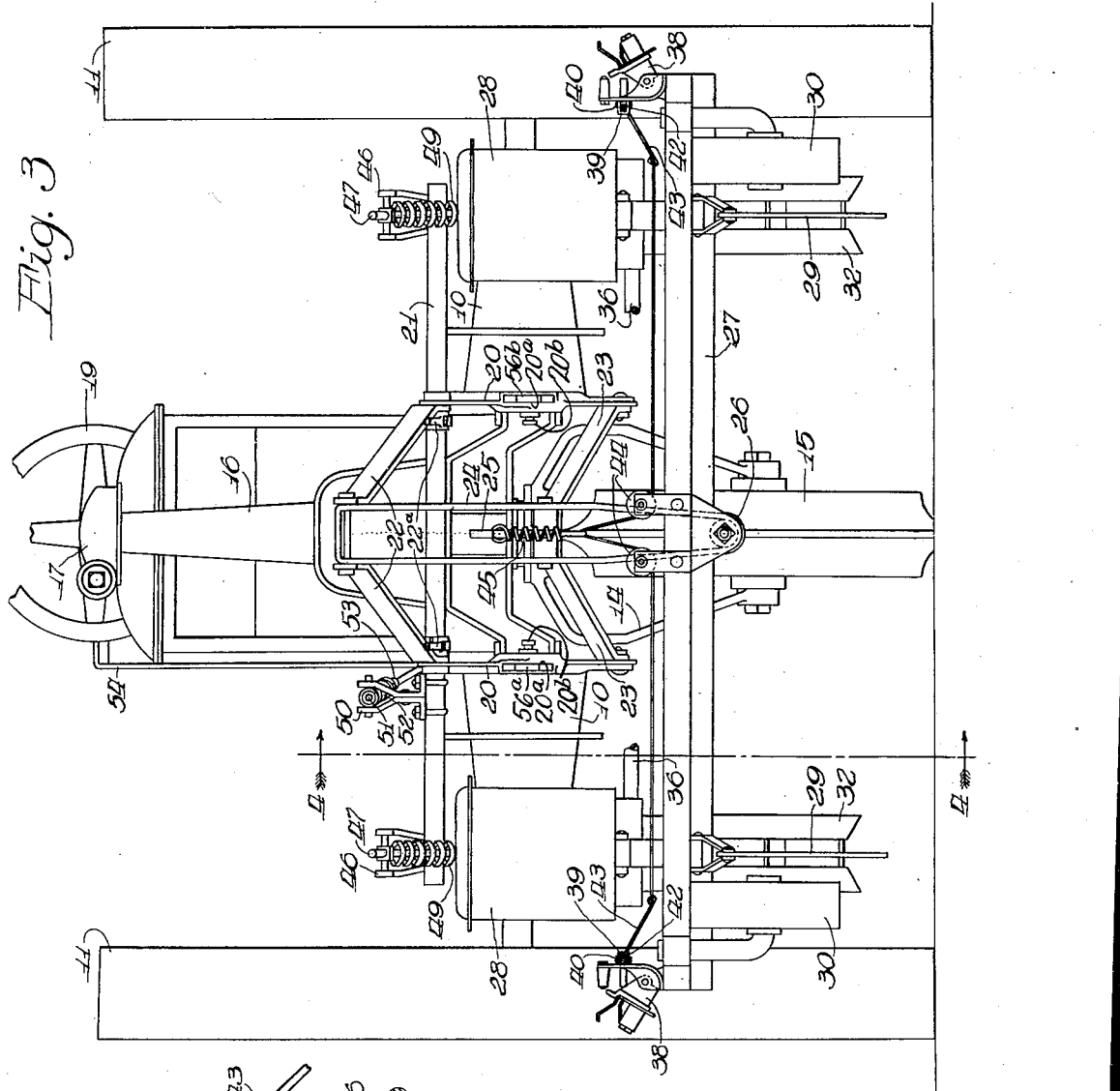
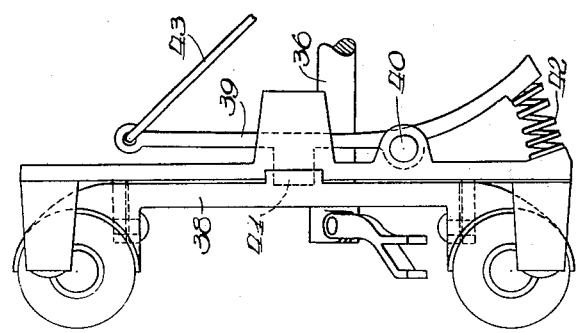

Sept. 15, 1936.　　　G. M. KRIEGBAUM ET AL　　　2,054,513
PLANTER ATTACHMENT FOR TRACTORS
Filed July 5, 1934　　　4 Sheets—Sheet 4

Fig. 4

Inventors
George M. Kriegbaum
Clarence C. Haas
By V. F. Sprague
Atty.

Patented Sept. 15, 1936

2,054,513

UNITED STATES PATENT OFFICE 2,054,513

PLANTER ATTACHMENT FOR TRACTORS

George M. Kriegbaum and Clarence C. Haas, Richmond, Ind., assignors to International Harvester Company, a corporation of New Jersey Application July 5, 1934, Serial No. 733,784

20 Claims. (Cl. 111—59)

The invention relates to tractor propelled farm implements, and more particularly to a forward connected planter attachment for tractors.

The main object of the invention is to provide a light and easily attachable and detachable form of two-row planter for connection to the forward end of a row-crop tractor, which will be free to conform to variations in the ground surface and easy to control. Other objects are to maintain the planter in substantially horizontal position during vertical movement and to provide for automatic disconnection of the check-wire, in cases where a check-row planter is used, as the planter is lifted.

The foregoing, as well as other, objects and advantages hereinafter disclosed are attained by the structure now to be described as illustrating one possible embodiment of the invention, which structure is shown in the accompanying drawings, wherein:

Figure 3 is a front end view of the tractor and planter on an enlarged scale with the planter shown in elevated or transport position;

Figure 4 is a side view of the structure shown in Figure 3 with the planter frame shown in section on the line 4—4 of Figure 3; and, Figure 5 is an enlarged detail plan view of the planter check-head.

Figure 1:
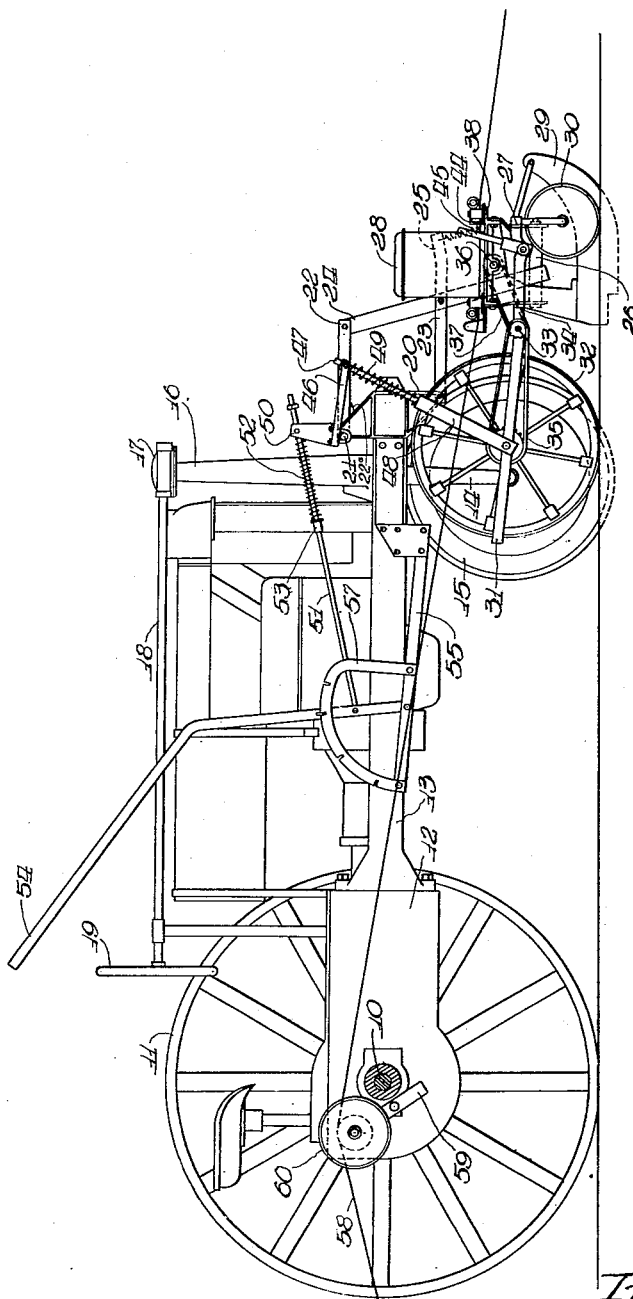
Figure 1 is a side view of a row crop tractor having the novel planter attachment connected thereto, the rear axle of the tractor being shown in section.

In the preferred form of the invention, the tractor employed in the combination is of the well known row crop or tricycle type, comprising rear axle housings 10 supported on traction wheels 11, which span the space of two plant rows of crops, such as corn or cotton. The rear axle housings are secured to a forwardly extending body portion 12 including the power plant, etc., of the tractor, which are mounted between side members 13 supported at their front ends on a dirigible truck 14, which preferably has a single wheel 15. The truck has an upright shaft journaled in a tubular front end member 16 of the tractor. The upper end of the truck shaft is connected by suitable gearing, contained in a housing 17, with a steering shaft 18 controlled by the hand wheel 19 adjacent the operator's station on the tractor.

In the practice of the present invention, the front end of the tractor at each side has detachable supporting brackets 20 carried on fixed, forwardly projecting plate or bar member 56ª and 56ᵇ secured to the tractor, which brackets have portions extending above and below the side members 13, as best seen in Figure 4. The upper ends of these brackets are formed with bearings for a transversely extended rockshaft 21, which projects at both sides beyond the tractor body and moves to and fro in a reciprocating or oscillating manner when operated. Adjacent its bearings in the brackets 20, the shaft 21 has pivoted thereto a pair of forwardly extending converging push members or arms 22. Another pair of similar push members 23 is arranged below the members 22 in parallel relation thereto, with the rear ends of the lower pair of members 23 pivoted to the lower ends of the brackets 20. Fixed pick-up arms 22ª on shaft 21 underlie the push arms 22. The converging front ends of the superposed push members 22 and 23 are pivoted to an upright supporting frame 24, the lower push members 23 having a forwardly extending portion or arm 25 projecting beyond the support 24 for a purpose to be described. The lower end of the upright frame 24 has secured to it an elongated bearing sleeve 26 extending fore and aft or longitudinally of the tractor. The sleeve 26 receives a pivot or shaft centrally mounted on a transversely extended planter frame 27, which is thus located forwardly of the tractor with its outer portion extending at each side to approximately the tread lines of the rear traction wheels. At each end, the planter frame 27 has mounted on it a planting unit comprising the usual seed dispensing hopper 28 and the furrow opening runner 29. A depth gauge wheel 30 is also mounted at each end of the planter frame to regulate depth of planting. In trailing relation to each planting unit, there are pivotally connected to the planter frame the wheel frames 31 in which are journaled the covering and drive wheels 32, which are located at each side of the wheel 15 of the dirigible truck. Each of the wheel frames 31 is pivoted on a cross shaft 33 journaled in yoke brackets 34 secured to the rear side of the planter frame 27. The shaft 33 extends from end to end of the planter frame and is driven by sprocket chains 35 connected to sprockets on the respective covering wheels. The shaft 33 in turn drives the feed shaft 36, which operates the seeding mechanisms of the planting units, through the chain and sprocket connection 37. Each end of the planter frame carries the usual check-fork and check-head including a laterally rockable wire receiving portion 38, which doffs or releases the check-wire when unlatched and allowed to swing outwardly to the position shown in Figure 3, as usual with check-row planters. The members 20, 22, 23 and 24 with their respective attaching members constitute an upper supporting frame, while the transversely extending planter frame 27 and all members, such as the planter units secured thereto, constitute a lower implement frame. In the present instance, each check-head is released by means of a latch lever 39 (Figure 5) pivoted at 40 to the stationary portion of the check-head and having a latch portion 41 normally interlocking with the swinging portion 38 to hold it in upright or operating position. The latch lever 39 is normally held in locking position by a coil spring 42 confined between one end of the lever 39 and the adjacent end of the stationary portion of the check-head. The other end of the lever 39 is connected to a cord or wire 43 extending towards the middle of the planter frame and passing over a guide roller 44 on the planter frame and then upward to the lower end of a depending coil spring 45 connected to the projecting arm 25 of the lower push members 23.

The construction so far described affords a freely floating planter construction, the various parts of which will adapt themselves to variations in ground contour as the planter frame can rock laterally on its pivot in the bearing sleeve 26 and can rise and fall by reason of its pivotal connections to the push members 22 and 23. Moreover, the respective covering wheels are each capable of independent vertical movements.

In order to lift and lower the planter frame and covering wheels, and at the same time release the check-wire from the check-head, the rockshaft 21 has a forwardly extending lift arm 46 secured to it at each end in a position just above each wheel frame 31. Each of the arms 46 is slidably connected to a lifting link 47 secured at its lower end in the upper part of a lifting yoke 48 pivoted to the wheel frame on the axis of the covering wheel. A compression spring 49 confined between the upper end of the yoke 48 and the end of arm 46 and a suitable stop on the upper end of the link 47 is engaged by the arm when swung to lift the wheel frame. The spring 49 serves to yieldably hold the covering wheel in engagement with the soil. At a point adjacent the under side of the tractor, the shaft 21 has secured to it an upright arm 50 slidably connected at its upper end to a rearwardly extending rod 51, which carries a compression spring 52 abutting a stop 53 on the rod and normally urging the arm 50 in a direction to lower the planter and exert pressure on the covering wheels. The rear end of the rod 51 is pivoted to a hand lever 54 carried on a rearward extension 55 of a plate or bar member 56a secured to the right side member of the tractor in connection with the bracket 20. The right and left bar members 56a and 56b, which are secured to the tractor, form with the slotted portions 20a of the supporting brackets 20 complementary attaching members whereby the implement attachment may be quickly attached and detached from the tractor. The member 56a is an extension of the plate member 56. The set screws 20b secure the supporting bracket 20 to the right and left bar members 56a and 56b. The hand lever 54 cooperates with the usual locking segment 57 and may be locked in position to retain the planter either in elevated position or to impose pressure on the covering wheels with the planter in lowered position. With the construction described, swing movements of the lever 54 will serve to rock the shaft 21 to either lift or lower the planter and simultaneously lift or lower the wheel frames. With the planter in operating position, as in Figure 1, the spring 52 will be compressed and the covering wheels will be yieldably held in operating position. The shaft 21 serves to raise and lower the planter and to put pressure on the covering wheels. The two pick-up arms 22a, one adjacent each upper push member 22 and rigidly secured to the shaft 21, are in such relation to members 22 that, when lever 54 is swung rearwardly, these arms 22a contact with the lower sides of members 22 and swing these upwardly to raise the planter. When lever 54 is swung forwardly, the planter is lowered to the ground and further movement of the lever moves the arms 22a downward out of engagement with members 22, allowing free vertical, floating movement of the frame, whereby a lost motion connection is provided between the pick-up arms 22a and the push members 22. This further movement of lever 54 serves to apply pressure to the covering wheels.

Figure 2:
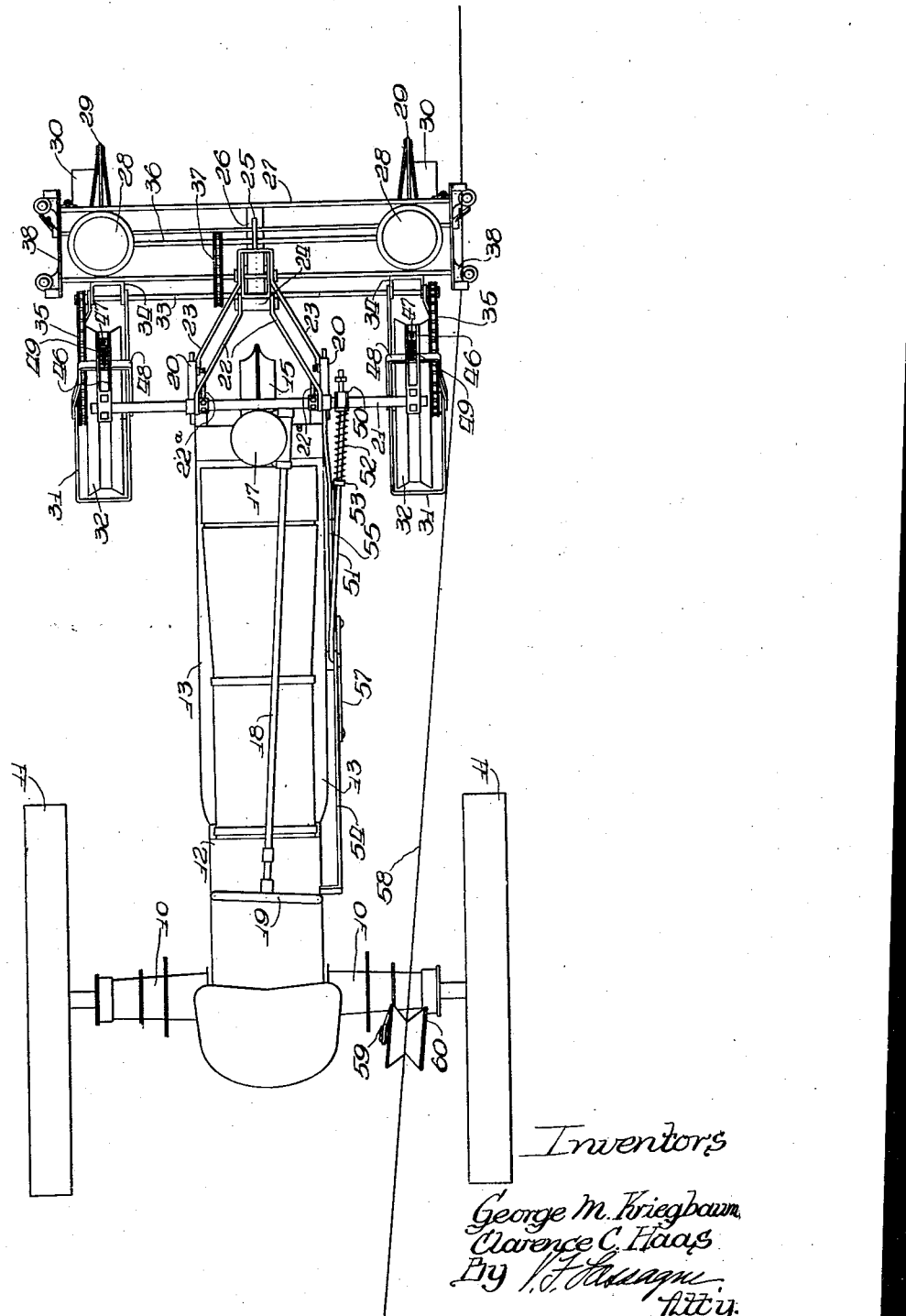
Figure 2 is a plan view of Figure 1.

In order to properly guide the check-wire after its passage through the check-head, the rear axle housing of the tractor is provided with a supporting bracket 59 carrying a guide sheave 60, the periphery of which is deeply grooved to retain the check-wire. This sheave is produced at an angle, as shown in Figure 2, and directs the check-wire over the axle end laterally with respect to the tractor.

The foregoing description is illustrative of a planter and tractor combination comprising a planter attachment which may be easily connected to and detached from the front end of a row-crop tractor, and in which the vertical movements will be maintained in parallel relation to the ground while the various parts of the planter may accommodate themselves to the soil surface. The preferred embodiment illustrated may be varied without departure from the scope of the invention as defined in the following claims.

What is claimed is:

1. The combination with a tractor having a dirigible front truck, of a transversely extended planter frame positioned ahead of the truck, a planting unit including a furrow opening runner carried by each end of the planter frame, a floating wheel frame connected to each end of the planter frame, a covering wheel in each floating frame, said wheels located at opposite sides of the truck and in trailing relation to the runners, means connecting the central portion of the planter frame to the front end of the tractor for floating movement vertically, and means on the tractor for simultaneously raising or lowering the planter frame and the wheel frames.

2. The combination with a tractor having a dirigible front truck, of a transversely extended planter frame positioned ahead of the truck, a planting unit including a furrow opening runner carried by each end of the planter frame, a floating wheel frame connected to each end of the planter frame, a covering wheel in each floating frame, said wheels located at opposite sides of the truck and in trailing relation to the runners, means connecting the central portion of the planter frame to the front end of the tractor for floating movement vertically including a member pivotally connected to the planter frame on an axis extending longitudinally of the tractor, and means on the tractor for simultaneously raising or lowering the planter frame and the wheel frames.

3. The combination with a tractor having a dirigible front truck, of a transversely extended planter frame positioned ahead of the truck, a planting unit including a furrow opening runner carried by each end of the planter frame, a floating wheel frame connected to each end of the planter frame, a covering wheel in each floating frame, said wheels located at opposite sides of the truck and in trailing relation to the runners, means connecting the central portion of the planter frame to the front end of the tractor for floating movement vertically comprising a substantially upright frame pivotally connected at its lower end to the center of the planter frame by an elongated pivot bearing extending longitudinally of the tractor and vertically movable connections between the upper portion of said upright frame and the tractor, and means on the tractor for simultaneously raising or lowering the planter frame and the wheel frames comprising a rockshaft mounted on the front end of the tractor above the wheel frames and lifting arms on said shaft respectively connected to said upright frame and the respective wheel frames.

4. The combination with a tractor, of a transversely extended planter frame positioned ahead of the tractor, a planting unit on each end of said frame, a substantially upright support pivotally connected at its lower end to the center of the planter frame to allow lateral tilting movement of the planter frame, supporting brackets on the front end of the tractor, and forwardly extending push members pivotally connected to said brackets and to the upper portion of the upright support on horizontal transverse axes.

5. The combination with a tractor, of a transversely extended planter frame positioned ahead of the tractor, a planting unit on each end of said frame, a substantially upright support pivotally connected at its lower end to the center of the planter frame to allow lateral tilting movement of the planter frame, supporting brackets on the front end of the tractor, and parallel, superposed, push members extending forwardly from said brackets and pivoted thereto and to the upper portion of the upright support on horizontal transverse axes.

6. The combination with a tractor, of a transversely extended planter frame positioned ahead of the tractor, a planting unit on each end of said frame, a substantially upright support pivotally connected at its lower end to the center of the planter frame to allow lateral tilting movement of the planter frame, supporting brackets secured to the front end of the tractor in laterally spaced relation, a rockshaft journaled in said brackets, forwardly extending push members pivoted to said shaft and pivotally connected to the upper portion of the upright support, means on said shaft for swinging said members upwardly, and means on the tractor for rocking the shaft.

7. The combination with a tractor, of a transversely extended planter frame positioned ahead of the tractor, a planting unit on each end of said frame, a substantially upright support pivotally connected at its lower end to the center of the planter frame to allow lateral tilting movement of the planter frame, supporting brackets secured to the front end of the tractor in laterally spaced relation, a rockshaft journaled in the upper portions of said brackets, parallel, superposed, push members extending forwardly from said brackets and pivoted thereto and to the upper portion of the upright support on horizontal transverse axes, certain of said push members having lost motion connection with the rockshaft, and means on the tractor for rocking the shaft.

8. The combination with a tractor, of a transversely extended planter frame, check-wire actuated planting units on each end of said frame including wire doffing means, vertically swingable members pivotally connecting the middle portion of the planter frame with the tractor, one of said members being extended at its outer end beyond its pivotal connection to the planter, doffer operating means connected to said extended outer end and actuated by upward swinging movement thereof, and means on the tractor for swinging said members to lift or lower the planter frame.

9. The combination with a tractor, of a check-row planter directly connected to the tractor for movement vertically, means for freely supporting said planter from said tractor in transporting position, check-heads including wire doffing means carried by the planter, means on the tractor for lifting and lowering the planter, and means actuated by lifting movement of the planter for operating the wire doffing means when said planter is raised for transporting.

10. The combination with a tractor, of a check-row planter directly connected to the tractor by lifting and lowering means including vertically swingable members, means for freely supporting said planter from said tractor in transporting position, check-heads including wire doffing means carried by the planter, means on the tractor for swinging said members to lift or lower the planter, and doffer operating means connected to one of said swingable members and actuated by upward movement thereof when said planter is raised for transporting.

11. The combination of a tractor having a frame, an implement attachment supported from said frame, laterally spaced means on said frame for supporting said implement attachment therefrom, said implement attachment comprising a lower implement frame having a plurality of ground engaging tools laterally spaced thereon, some of said tools being rigidly connected to said implement frame, and others of said tools being pivotally connected to said frame, and an upper supporting frame pivotally connected to said lower frame on a longitudinal axis, said upper frame having laterally spaced supports for quickly attaching to said laterally spaced means on said tractor, and lifting links supported from the aforesaid spaced supports and pivotally connected to said upper frame, and means for raising and lowering said implement frame.

12. The combination as set forth in claim 11, wherein a transverse rockshaft is pivotally mounted in the aforesaid laterally spaced supports, means on said rockshaft for applying pressure to the aforesaid pivotally connected tools, and a lost motion connection between said transverse rockshaft and the aforesaid lifting links whereby said implement frame may be raised and lowered, and when said implement frame is in ground engaging position said implement frame may be free to follow the vertical and transverse configurations of the ground, and additional pressure may be applied to the aforesaid pivotally connected tools by the raising and lowering means.

13. The combination of a tractor having a frame, a planter attachment supported from said frame, said planter attachment comprising a lower implement frame having a plurality of ground engaging tools laterally spaced thereon, some of said tools being rigidly connected to said implement frame and others of said tools being pivotally connected to said implement frame, and an upper supporting frame pivotally connected to said lower frame on a longitudinal axis, said upper frame having laterally spaced supports for quickly attaching to said tractor frame, and lifting links supported from the aforesaid spaced supports and pivotally connected to said upper frame, means for raising and lowering said implement frame, and gauging means mounted on said implement frame and adjacent to said rigidly supported ground engaging tools.

14. In the combination as set forth in claim 13, wherein the planter attachment comprises a transverse rockshaft pivotally mounted in the aforesaid laterally spaced supports, means on said rockshaft for applying pressure to the aforesaid pivotally connected tools, and a lost motion connection between said transverse rockshaft and the aforesaid lifting links whereby said implement frame may be raised and lowered, and when said implement frame is in ground engaging position said implement frame may be free to follow the vertical and transverse configurations of the ground, and additional pressure may be applied to the aforesaid pivotally connected tool by the raising and lowering means.

15. The combination as set forth in claim 13, wherein the planter attachment is of the check wire type comprising laterally spaced check-heads including wire doffing means mounted on the implement frame, and means actuated by the lifting movement of the planter attachment for operating the wire doffing means when said planter attachment is raised for transporting.

16. The combination as set forth in claim 13, wherein the planter attachment is of the check wire type comprising laterally spaced check-heads including wire doffing means mounted on the implement frame, means actuated by the lifting movement of the planter for operating the wire doffing means when said planter is raised for transporting, and a laterally spaced check wire guide mounted on said tractor frame.

17. The combination of a tractor and an implement attachment of the quickly attachable and detachable type supported from said tractor, bar-shaped means laterally spaced on said tractor for supporting said implement attachment, complementary slotted supporting means on said implement attachment for attaching to said bar-shaped means, and means for securing said implement attachment to said bar-shaped means.

18. The combination of a tractor and an implement attachment of the quickly attachable and detachable type supported from said tractor, attaching means laterally spaced on said tractor for supporting said implement attachment, complementary attaching means on said implement attachment for supporting said attachment, said attaching means being bar-shaped and slotted whereby said implement attachment may be suspended from said tractor, and means for securing said implement attachment to said bar-shaped means.

19. The combination of a tractor and an implement attachment of the quickly attachable and detachable type supported from said tractor, attaching means laterally spaced on said tractor for supporting said implement attachment, complementary attaching means on said implement attachment for supporting said attachment, said attaching means being bar-shaped and slotted whereby said implement attachment may be suspended from said tractor, means for securing said implement attachment to said bar-shaped means, and means on said complementary attaching means on said implement attachment for raising and lowering said implement attachment.

20. The combination of a tractor and an implement attachment of the quickly attachable and detachable type supported from said tractor, attaching means laterally spaced on said tractor for supporting said implement attachment, complementary attaching means on said implement attachment for supporting said attachment, said attaching means being bar-shaped and slotted whereby said implement attachment may be suspended from said tractor, means for securing said implement attachment to said bar-shaped means, and transverse means mounted on said complementary attaching means for reciprocating movement, whereby said implement attachment may be raised and lowered.

GEORGE M. KRIEGBAUM.
CLARENCE C. HAAS.